(12) United States Patent
Tokoyoda et al.

(10) Patent No.: US 9,302,913 B2
(45) Date of Patent: Apr. 5, 2016

(54) METHOD FOR PRODUCING METAL NITRIDE

(75) Inventors: Kazuhiko Tokoyoda, Chiba (JP); Shoji Suzuki, Yachiyo (JP); Tomoki Hatsumori, Yachiyo (JP)

(73) Assignee: TAIHEIYO CEMENT CORPORATION, Tokyo (JP)

( * ) Notice: Subject to any disclaimer, the term of this patent is extended or adjusted under 35 U.S.C. 154(b) by 136 days.

(21) Appl. No.: 13/812,721

(22) PCT Filed: Aug. 11, 2011

(86) PCT No.: PCT/JP2011/068341
§ 371 (c)(1),
(2), (4) Date: Jan. 28, 2013

(87) PCT Pub. No.: WO2012/020819
PCT Pub. Date: Feb. 16, 2012

(65) Prior Publication Data
US 2013/0129600 A1   May 23, 2013

(30) Foreign Application Priority Data

Aug. 11, 2010 (JP) .................................. 2010-179905

(51) Int. Cl.
C01B 21/06   (2006.01)

(52) U.S. Cl.
CPC ............. C01B 21/0627 (2013.01); C01B 21/06 (2013.01); C01B 21/061 (2013.01); C01B 21/0607 (2013.01); C01B 21/0612 (2013.01); C01P 2002/72 (2013.01)

(58) Field of Classification Search
None
See application file for complete search history.

(56) References Cited

U.S. PATENT DOCUMENTS

| 2,461,018 | A | * | 2/1949 | Alexander | .................... 423/411 |
| 2,893,862 | A | * | 7/1959 | Walaschewski et al. | ........ 75/407 |
| 3,322,510 | A | * | 5/1967 | Pascard et al. | ................ 423/251 |
| 4,321,163 | A | * | 3/1982 | Wahl et al. | .................... 252/513 |
| 2005/0118087 | A1 | | 6/2005 | Lacoste | |

FOREIGN PATENT DOCUMENTS

| CN | 101397129 A | 4/2009 |
| CN | 101613092 A | 12/2009 |
| CN | 101618865 A | 1/2010 |
| JP | 48-15159 | 5/1973 |
| JP | 49-106499 | 10/1974 |
| JP | 55 90406 | 7/1980 |
| JP | 62 108718 | 5/1987 |
| JP | 63 256505 | 10/1988 |
| JP | 2002293545 A | * 10/2002 |

(Continued)

OTHER PUBLICATIONS

Frenkel et al.; Conditions of Titanium and Vanadium Mononitride Particles After Nitriding and Heat Treatment; Poroshkovaya Metal-lurgiya; No. 7 (115), pp. 34-39; Jul. 1972.*

(Continued)

*Primary Examiner* — Guinever S Gregorio
(74) *Attorney, Agent, or Firm* — Oblon, McClelland, Maier & Neustadt, L.L.P.

(57) ABSTRACT

There is provided a method for producing a high-purity metal nitride by simple processes with good yield.

Specifically provided is a method for producing a metal nitride including heating a metal hydride under a nitrogen gas or an ammonia gas.

14 Claims, 11 Drawing Sheets

(56) References Cited

FOREIGN PATENT DOCUMENTS

| JP | 2005 531483 | 10/2005 |
|---|---|---|
| JP | 2011-52099 A | 3/2011 |

OTHER PUBLICATIONS

Goon; The Non-Stoichiometry of Lanthanum Hydride; J. Phys. Chem.; 63, pp. 2018-2021; 1959.*

Kagaku Daijiten, Encyclopedic Dictionary of Chemistry, First Edition, p. 1413, (Oct. 20, 1989) (with partial English translation).

Shin Jikken Kagaku Koza 8, Muki Kagoubutsu no Gosei (I), New Experimental Chemistry Course 8, Synthesis I of Inorganic Compounds, p. 414, (Dec. 20, 1976) (with partial English translation).

Kagaku Daijiten 5, Encyclopedia Chimica, vol. 5, Reduced Edition, The 30$^{th}$ impression of the reduced edition, p. 880 (Feb. 15, 1987) (with partial English translation).

Nakahara, M., Muki Kagoubutsu Sakutai Jiten, Dictionary of Inorganic Compounds & Complexes, p. 476, (Jun. 10, 1997) (with partial English translation).

International Search Report Issued Nov. 15, 2011 in PCT/JP11/68341 Filed Aug. 11, 2011.

Combined Chinese Office Action and Search Report issued Apr. 9, 2014, in Chinese Patent Application No. 201180033708.1 with English translation of category of cited documents.

Office Action issued Aug. 5, 2014, in Japanese Patent Application No. 2011-174790 with English translation.

Chemical Society of Japan, New Experimental Chemistry Course 8 Inorganic Compound Synthesis I (*Shin Jikken Kagaku Koza 8 Muki Kagobutsu Gosei I*), Maruzen Co. Ltd., 1976, p. 416 with partial English translation.

Ken-ichi Machida, et al., "Synthesis and Luminescence Properties of CaAlSiN$_3$:Eu$^{2+}$ using CaH$_2$", 2010 spring, annual 57$^{th}$ Meeting of the Japan Society of Applied Physics and Related Societies "Meeting Proceedings", the Japan Society of Applied Physics, Mar. 3, 2010, pp. 14-230 with partial English translation.

Office Action issued Mar. 24, 2015 in Japanese Patent Application No. 2011-174790 (with English translation).

David P. Schumacher et al.; Magnetic Characteristics of Some Lanthanide Nitrides, J., Inorg. Chem., US, Sep. 1966 vol. 5, No. 9, p. 1563.

* cited by examiner ment No. 2010-179905, filed on Aug. 11, 2010.

METHOD FOR PRODUCING METAL NITRIDE

CROSS REFERENCE TO RELATED APPLICATION

This application is a 371 of PCT/JP2011/068341, filed on Aug. 11, 2011, and claims priority to Japanese Patent Application No. 2010-179905, filed on Aug. 11, 2010.

TECHNICAL FIELD

The present invention relates to a method for producing a metal nitride, particularly an alkali metal nitride, an alkaline earth metal nitride or a lanthanoid metal nitride.

BACKGROUND ART

In recent years, attention has been directed to a metal nitride as a material such as a raw material of an aluminum nitride used for a semiconductor device, a metal sliding member, an electrode construction material and the like. Many fluorescent materials using a metal nitride have also been found, and the demand as the raw material has also increased. A high-purity product is required for the metal nitride used for the applications.

Examples of a conventional method for producing a metal nitride include a method for heating alkaline earth metals such as calcium in a nitrogen gas stream (Non Patent Literatures 1 and 2).

However, this method nitrides only the surfaces of a metal, and has difficulty in nitriding the inside thereof. Therefore, the metal nitride obtained by the method cannot be used for the above-mentioned application like a semiconductor device requiring a high-purity product.

Another method is a method for heating calcium with ammonia, a problem of which method is production of a calcium hydride as a by-product (Non Patent Literature 3). Furthermore, yet another method is a method for heating tricalcium tetranitride to 250° C., problems of which are explosiveness and toxicity (Non Patent Literature 4).

Furthermore, there is disclosed a method for reacting a molten zinc-calcium alloy with a heated and pressurized nitrogen jet to synthesize a calcium nitride (Patent Literature 1). However, this method requires a special device, and thus it is difficult to say that the method is an industrially advantageous method.

PRIOR ART LITERATURE

Patent Literature

[Patent Literature 1] JP-A-2005-531483

Non Patent Literature

[Non Patent Literature 1] "Kagaku Daijiten (Encyclopedic Dictionary of Chemistry)", first edition, edited by Michinori Oki et al., Tokyo Kagaku Dojin, first edition, p. 1413, 1989
[Non Patent Literature 2] "Shin Jikken Kagaku Koza 8, Muki Kagoubutsu no Gosei (I) (New Experimental Chemistry Course 8, Synthesis of Inorganic Compounds (I))", edited by the Chemical Society of Japan, Maruzen Co., Ltd., p. 414, 1976,
[Non Patent Literature 3] "Kagaku Daijiten 5 (Encyclopaedia Chimica 5)", miniature edition, Kyoritsu Shuppan Co., Ltd., p. 880, 1987
[Non Patent Literature 4] "Muki Kagoubutsu Sakutai Jiten (Dictionary of Inorganic Compounds and Complexes)", Masayoshi Nakahara, Kodansha Ltd., p. 476, 1997

Summary of Invention

Problem to be Solved by the Invention

However, each of the metal nitrides obtained by the conventional method had low purity, and could not be used for the application requiring the high-purity product.

It is an object of the present invention to provide a method for simply producing a high-purity metal nitride with good yield without causing the above-mentioned problems.

Means for Solving the Problem

The present inventors carried out diligent studies in view of the above-mentioned circumstances. As a result, the inventors found that a metal hydride is used as a raw material, and the hydride can merely be heated under a nitrogen gas or an ammonia gas to obtain a high-purity metal nitride with good yield, and completed the present invention.

That is, the present invention provides a method for producing the metal nitride, the method including heating a metal hydride under a nitrogen gas or an ammonia gas.

The present invention provides a metal nitride produced by heating a metal hydride under a nitrogen gas or an ammonia gas.

Advantageous Effect of Invention

The present invention can simply produce a high-purity metal nitride with good yield.

MODES FOR CARRYING OUT THE INVENTION

Figure 1:
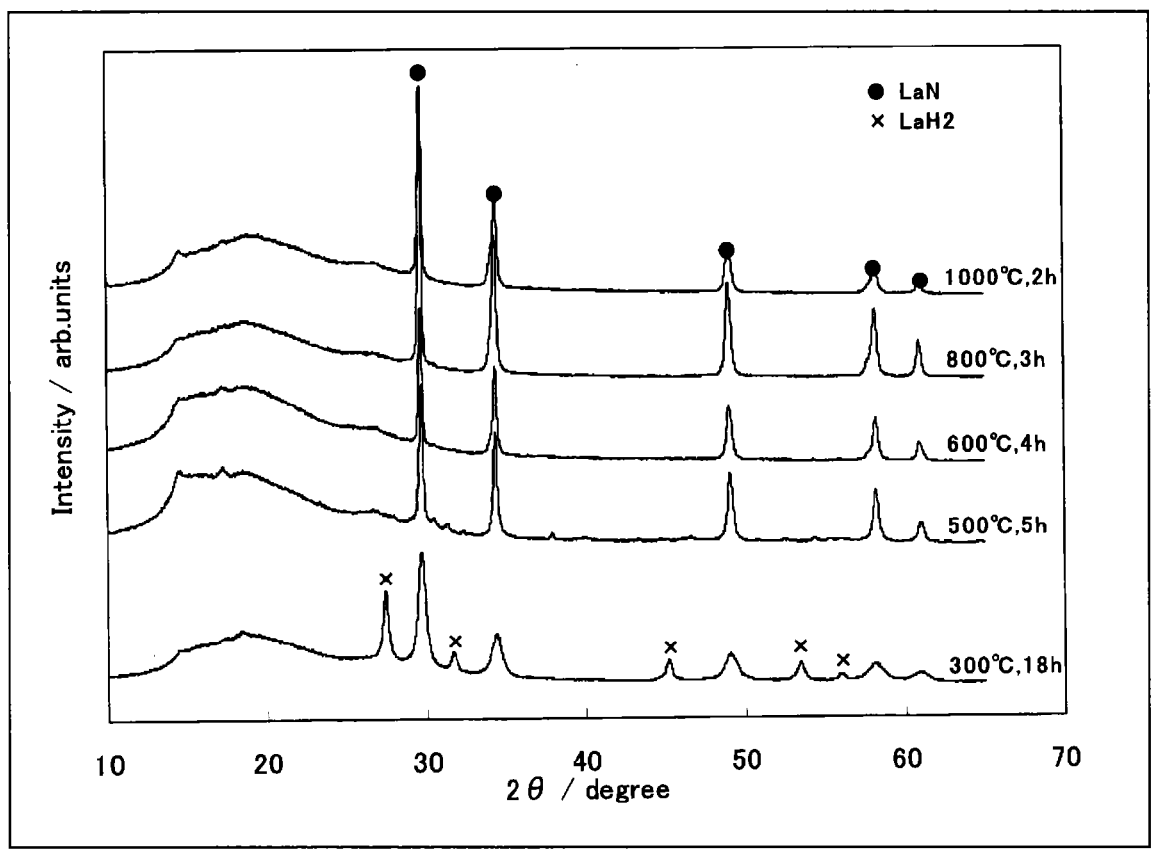
FIG. 1 shows the XRD results of lanthanum nitride obtained in Example 1.

Particularly, a metal hydride used for the present invention is preferably one or more kinds selected from an alkali metal hydride, an alkaline earth metal hydride, and a lanthanoid metal hydride. Herein, examples of the alkali metal hydride include LiH, NaH, and KH. Examples of the alkaline earth metal hydride include $BaH_2$, $MgH_2$, $CaH_2$, $SrH_3$, and $BaH_3$. Examples of the lanthanoid metal hydride include $LaH_3$, $CeH_3$, and $EuH_3$.

An alkali metal hydride as a raw material of the present invention can be produced by for example, a method for making hydrogen act on an alkali metal at a high temperature ("Kagaku Daijiten (Encyclopaedia Chimica)", miniature edition, Kyoritsu Shuppan Co., Ltd., the paragraphs of lithium hydride and potassium hydride), and the like.

An alkaline earth metal hydride as a raw material of the present invention can be produced by, for example, a method for making hydrogen act on an alkaline earth metal at a high temperature ("Kagaku Daijiten (Encyclopaedia Chimica)", miniature edition, Kyoritsu Shuppan Co., Ltd., the paragraphs of calcium hydride and barium hydride), and the like.

A lanthanoid metal hydride as a raw material of the present invention can be produced by, for example, a method for making hydrogen act on lanthanum ("Kagaku Daijiten (Encyclopaedia Chimica)", miniature edition, Kyoritsu Shuppan Co., Ltd., the paragraph of lanthanum), and the like.

A metal nitride can be produced also from a metal hydride other than the alkali metal hydride, the alkaline earth metal hydride, and the lanthanoid metal hydride by a method of the present invention.

The metal hydride used for the present invention is desirably a powder.

In the present invention, a nitriding reaction is performed by heating the metal hydride under a nitrogen gas or an ammonia gas. The nitrogen gas is preferably used. When the reaction is performed under the gas atmosphere, a pressure thereof is not particularly limited. However, the reaction is preferably performed at a normal pressure as being economical. The reaction may be performed in a batch or continuous system. In the case of mass production, the reaction is advantageously performed in the continuous system.

In the present invention, a heating temperature is preferably 100° C. or more, more preferably 300° C. or more and even more preferably 500° C. or more. The upper limit of the heating temperature is a temperature at which the produced metal nitride is not decomposed. However, the upper limit is preferably 1500° C. or less in views of a reactor and economical efficiency. Therefore, the heating temperature is preferably from 100 to 1500° C., more preferably from 300 to 1300° C. and even more preferably from 500 to 1200° C.

The heating temperature when the alkali metal hydride is used as a raw material in the present invention is preferably 100° C. or more, more preferably 300° C. or more, and even more preferably 400° C. or more. The upper limit of the temperature is a temperature at which the produced alkali metal nitride is not decomposed. However, the upper limit is preferably 1500° C. or less in views of a reactor and economic efficiency. Therefore, the heating temperature when the alkali metal hydride is used is preferably from 100 to 1500° C., more preferably from 300 to 1000° C., and particularly preferably from 400 to 900° C. The heating temperature is most preferably from 600 to 800° C.

The heating temperature when the alkaline earth metal hydride is used as a raw material in the present invention is preferably 400° C. or more, more preferably 500° C. or more, and even more preferably 600° C. or more. The upper limit of the temperature is a temperature at which the produced alkaline earth metal nitride is not decomposed. However, the upper limit is preferably 1500° C. or less in views of a reactor and economic efficiency. Therefore, the heating temperature when the alkaline earth metal hydride is used is preferably from 400 to 1500° C., more preferably from 500 to 1100° C., and particularly preferably from 600 to 1000° C. The heating temperature is most preferably from 700 to 900° C.

Furthermore, the heating temperature when the lanthanoid metal hydride is used as a raw material in the present invention is preferably 500° C. or more, more preferably 600° C. or more, and even more preferably 700° C. or more. The upper limit of the temperature is a temperature at which the produced lanthanoid metal nitride is not decomposed. However, the upper limit is preferably 1500° C. or less in views of a reactor and economic efficiency. Therefore, the heating temperature when the lanthanoid metal hydride is used is preferably from 500 to 1500° C., more preferably from 600 to 1300° C., and particularly preferably from 700 to 1200° C. The heating temperature is most preferably from 800 to 1000° C.

The reaction time may be suitably determined depending on the device, the reaction temperature, and the amount of a raw material. Usually, the reaction time is preferably from 10 minutes to 48 hours, more preferably from 1 hour to 24 hours, and particularly preferably from 3 hours to 12 hours.

The reaction device may be a device capable of withstanding a temperature of about 1500° C. For example, a tubular furnace, an electric furnace, a batch kiln, and a rotary kiln may be used.

Because only the target metal nitride remains in a powdery state in the reaction device in the case of the batch system, for example, after completing the reaction, the metal nitride is extremely easily collected.

On the other hand, when the rotary kiln filled with, for example, $N_2$ is used in the case of the continuous system, the metal nitride is easily and continuously collected.

As the obtained metal nitride, the alkali metal nitride, the alkaline earth metal nitride, and the lanthanoid metal nitride, for example, $Li_3N$, $Na_3N$, $K_3N$, $Be_3N_2$, $Mg_3N_2$, $Ca_3N_2$, $Ca_2N$, $Sr_3N_2$, $Sr_2N$, $Ba_3N_2$, $Ba_2N$, LaN, CeN, and EuN are preferred.

The metal nitride obtained by the method of the present invention has high purity because the nitriding reaction proceeds easily to the inside thereof.

EXAMPLES

Hereinafter, the present invention will be further described in detail with reference to Examples. However, the present invention is not limited to these Examples.

Example 1

A 200 cc pressure tight container was charged with 40 g of metal lanthanum, then vacuum-exhausted and filled with 1.5 MPa of hydrogen, to perform a reaction at a reaction temperature of 100° C. for 18 hours, to thereby obtain lanthanum hydride as a starting material. The obtained lanthanum hydride was used for the following test.

A producing test of a lanthanum nitride was performed under conditions of a temperature and a time (h) as shown in Table 1. That is, 3 g of a lanthanum hydride was placed in a furnace core tube (an inner diameter of 50 mm and a length of 600 mm) and the furnace core tube was sealed with a silicon cap in a glove box. The furnace core tube taken out from the glove box was set in a tubular furnace, and was heated in a nitrogen atmosphere.

TABLE 1

Reaction conditions of lanthanum nitride

| Reaction temperature (° C.) | Reaction time (h) | Reaction product |
|---|---|---|
| 1000 | 2 | Lanthanum nitride |
| 800 | 3 | Lanthanum nitride |
| 600 | 4 | Lanthanum nitride |
| 500 | 5 | Lanthanum nitride |
| 300 | 18 | Lanthanum nitride, lanthanum hydride |

Powder XRD analysis of the obtained LaN compound was performed. The LaN results are shown in FIG. 1. For reference, the XRD of the LaH$_2$ as a raw material is also shown in FIG. 1.

The XRD results show that a target high-purity lanthanum nitride is produced at high yield by heating from 500 to 1000° C. The XRD results also show that the higher a reaction temperature is, the shorter the reaction time is. The quantity of the lanthanum nitride obtained at 1000° C. was determined by a nitrogen-oxygen simultaneous analyzer. The N amount was 9.07 mass %, and the purity calculated from the theoretical amount (9.16 mass %) was 99.0%.

Example 2

Figure 2:
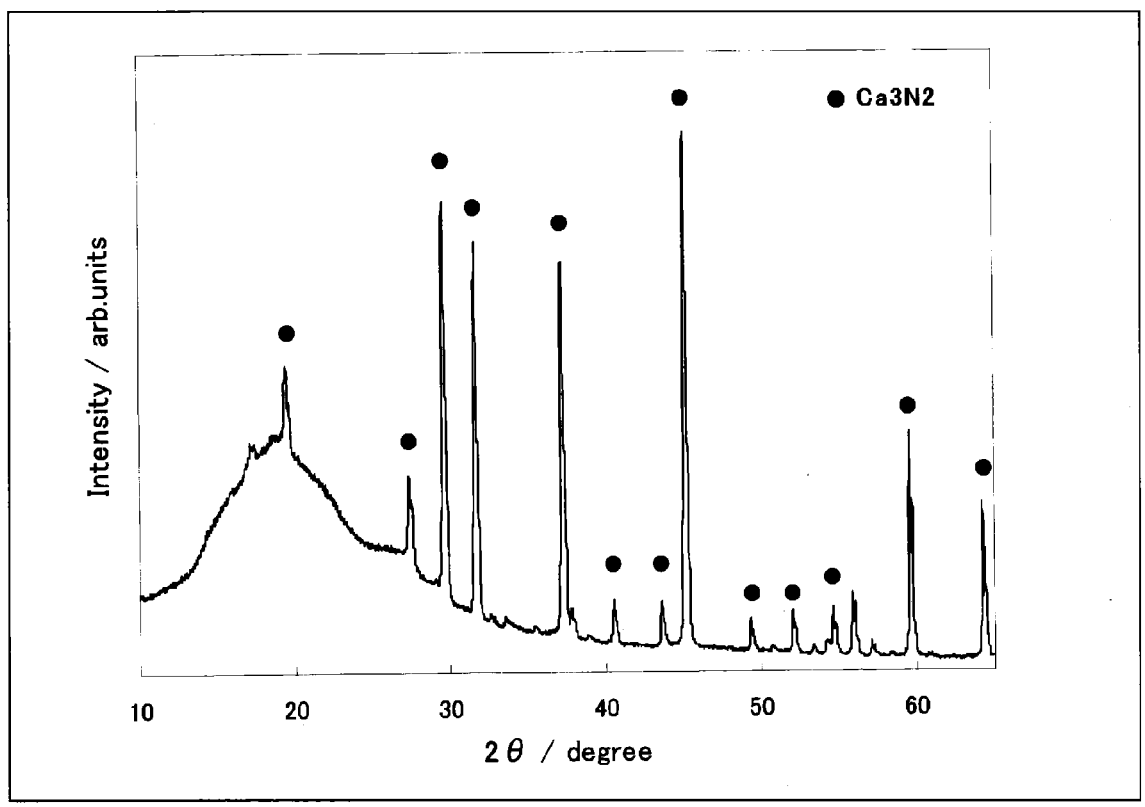
FIG. 2 shows the XRD results of calcium nitride obtained in Example 2.

A 200 cc pressure tight container was charged with 40 g of metal calcium, then vacuum-exhausted and filled with 10 MPa of hydrogen, to perform a reaction at a reaction temperature of 150° C. for 24 hours, to thereby obtain calcium hydride as a starting material. The same operation as that of Example 1 was performed by using 3 g of the obtained calcium hydride. A temperature at which the operation was performed under a N$_2$ gas atmosphere was 800° C., and a reaction time thereof was 16 hours. Powder XRD analysis of the obtained compound was performed. The whole phase was calcium nitride (Ca$_3$N$_2$) (see FIG. 2). The quantity of the obtained calcium nitride was determined by a nitrogen-oxygen simultaneous analyzer. The N amount was 18.40 mass %, and the purity calculated from the theoretical amount (18.90 mass %) was 97.4%.

Example 3

Figure 3:
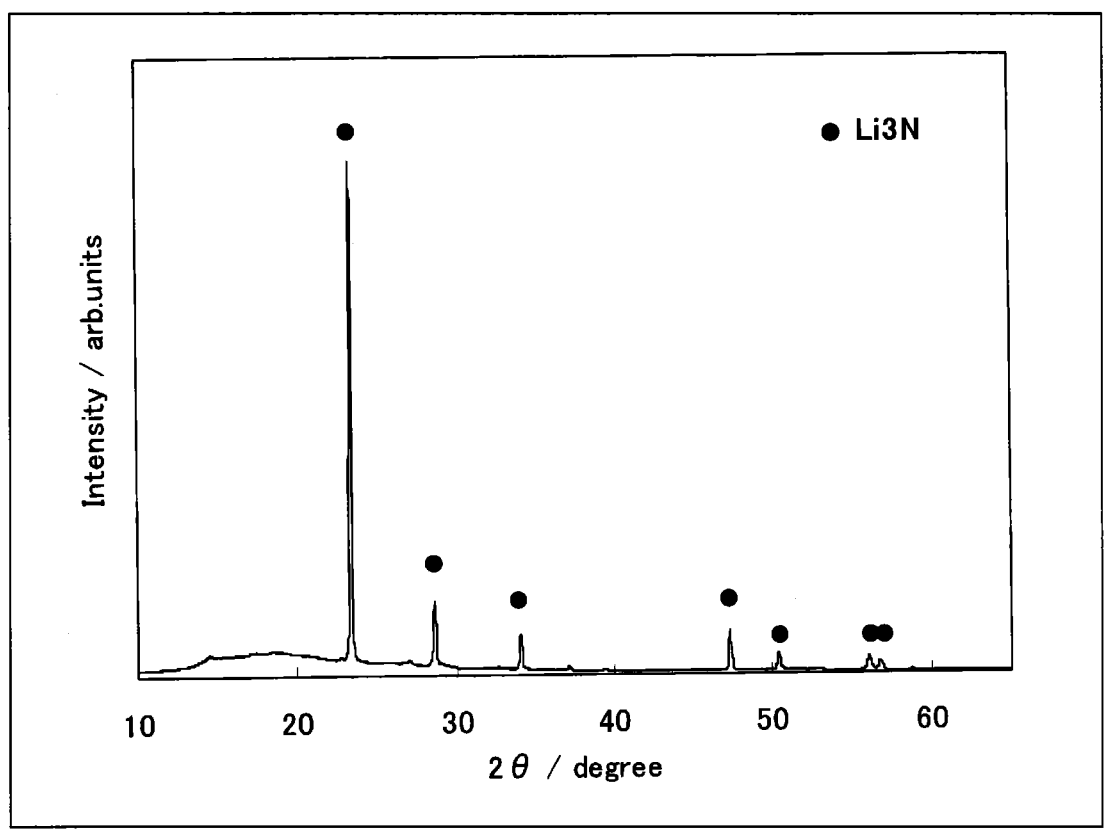
FIG. 3 shows the XRD results of lithium nitride obtained in Example 3.

A 200 cc pressure tight container was charged with 40 g of metal lithium, then vacuum-exhausted and filled with 10 MPa of hydrogen, to perform a reaction at a reaction temperature of 200° C. for 24 hours, to thereby obtain lithium hydride as a starting material. The same operation as that of Example 1 was performed by using 3 g of the obtained lithium hydride. A temperature at which the operation was performed under a N$_2$ gas atmosphere was 600° C., and a reaction time thereof was 16 hours. Powder XRD analysis of the obtained compound was performed. The whole phase was lithium nitride (Li$_3$N) (see FIG. 3). The quantity of the obtained lithium nitride was determined by a nitrogen-oxygen simultaneous analyzer. The N amount was 39.20 mass %, and the purity calculated from the theoretical amount (40.21 mass %) was 97.5%.

Comparative Example 1

The same operation as that of Example 1 was performed by using 3 g of metal lanthanum. A temperature at which the operation was performed under a N$_2$ gas atmosphere was 1000° C., and a reaction time thereof was 16 hours. Powder XRD analysis of the obtained compound was performed. The whole phase was lanthanum (La).

Comparative Example 2

The same operation as that of Example 1 was performed by using 3 g of metal calcium. A temperature at which the operation was performed under a N$_2$ gas atmosphere was 800° C., and a reaction time thereof was 16 hours. Powder XRD analysis of the obtained compound was performed. The whole phase was calcium (Ca).

Comparative Example 3

The same operation as that of Example 1 was performed by using 3 g of metal lithium. A temperature at which the operation was performed under a N$_2$ gas atmosphere was 600° C., and a reaction time thereof was 16 hours. Powder XRD analysis of the obtained compound was performed. The whole phase was lithium (Li).

The above-mentioned Comparative Examples show that the nitriding hardly proceeds even when the nitriding of the metal is attempted under the nitrogen atmosphere.

Example 4

Figure 4:
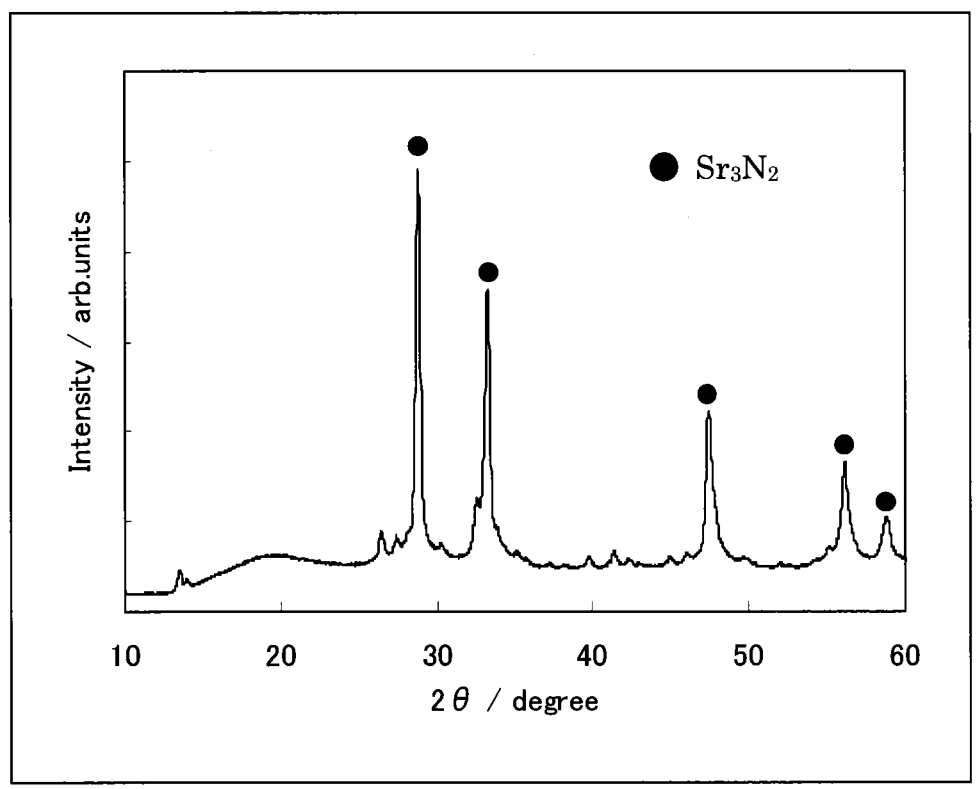
FIG. 4 shows the XRD results of strontium nitride obtained in Example 4.

A 200 cc pressure tight container was charged with g of metal strontium, then vacuum-exhausted and filled with 0.9 MPa of hydrogen, to perform a reaction at a reaction temperature of 150° C. for 12 hours, to thereby obtain strontium hydride as a starting material. The same operation as that of Example 1 was performed by using 3 g of the obtained strontium hydride. A temperature at which the operation was performed under a N$_2$ gas atmosphere was 900° C., and a reaction time thereof was 4 hours. Powder XRD analysis of the obtained compound was performed. The whole phase was strontium nitride (Sr$_3$N$_2$) (FIG. 4). The quantity of the obtained strontium nitride was determined by a nitrogen-oxygen simultaneous analyzer. The N amount was 9.5 mass %, and the purity calculated from the theoretical amount (9.63 mass %) was 98.7%.

Example 5

Figure 5:
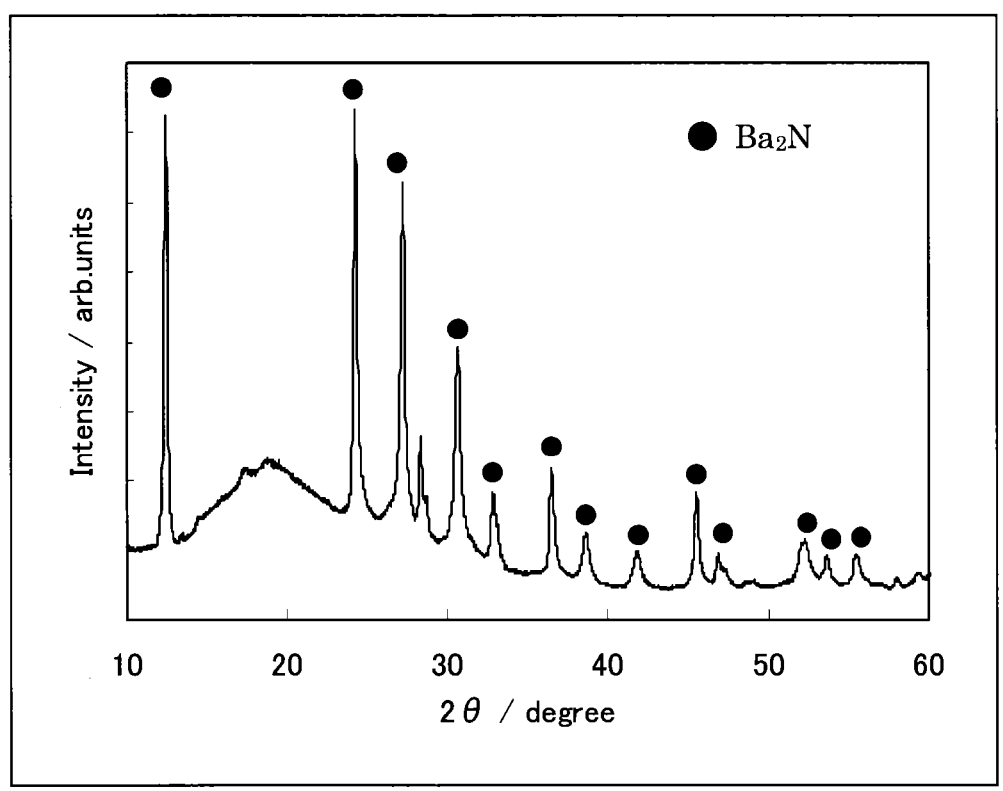
FIG. 5 shows the XRD results of barium nitride obtained in Example 5.

A 200 cc pressure tight container was charged with 40 g of metal barium, then vacuum-exhausted and filled with 0.9 MPa of hydrogen, to perform a reaction at a reaction temperature of 150° C. for 12 hours, to thereby obtain barium hydride as a starting material. The same operation as that of Example 1 was performed by using 3 g of the obtained barium hydride. A temperature at which the operation was performed under a N$_2$ gas atmosphere was 800° C., and a reaction time thereof was 4 hours. Powder XRD analysis of the obtained compound was performed. The whole phase was barium nitride (Ba$_2$N) (FIG. 5). The quantity of the obtained barium nitride was determined by a nitrogen-oxygen simultaneous analyzer. The N amount was 4.7 mass %, and the purity calculated from the theoretical amount (4.85 mass %) was 96.9%.

Example 6

Figure 6:
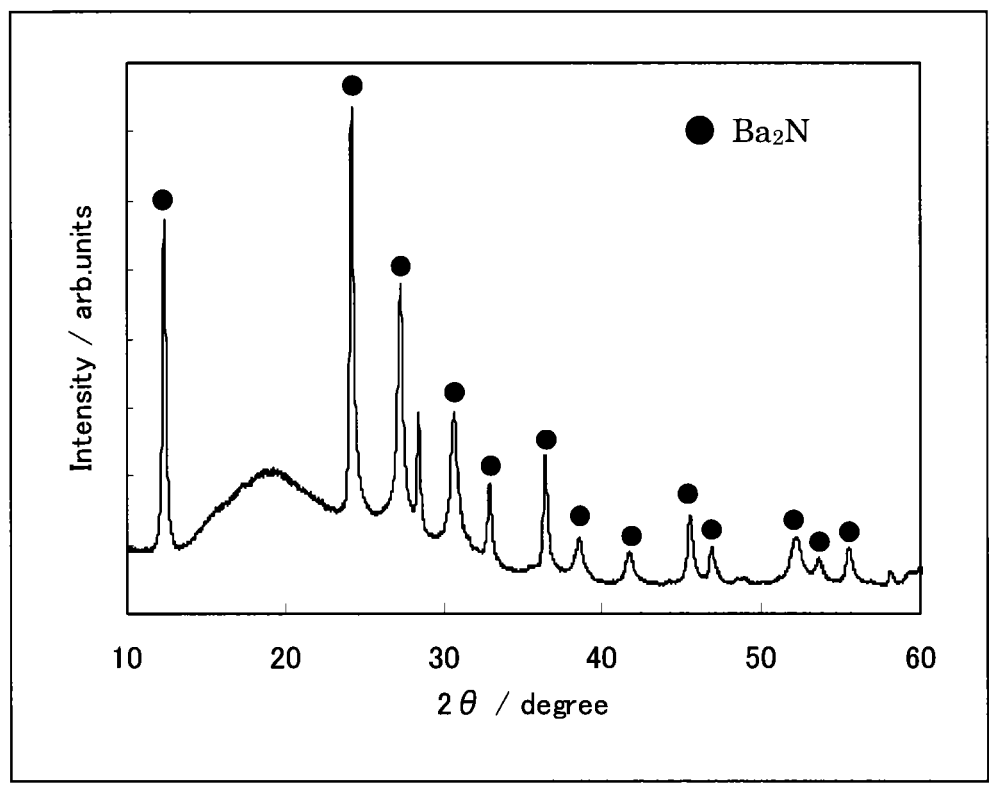
FIG. 6 shows the XRD results of barium nitride obtained in Example 6.

The same operation as that of Example 1 was performed by using 3 g of the obtained barium hydride. A temperature at which the operation was performed under a N$_2$ gas atmosphere was 900° C., and a reaction time thereof was 4 hours. Powder XRD analysis of the obtained compound was performed. The whole phase was barium nitride (Ba$_2$N) (FIG. 6).

The quantity of the obtained barium nitride was determined by a nitrogen-oxygen simultaneous analyzer. The N amount was 4.7 mass %, and the purity calculated from the theoretical amount (4.85 mass %) was 96.9%.

Example 7

Figure 7:
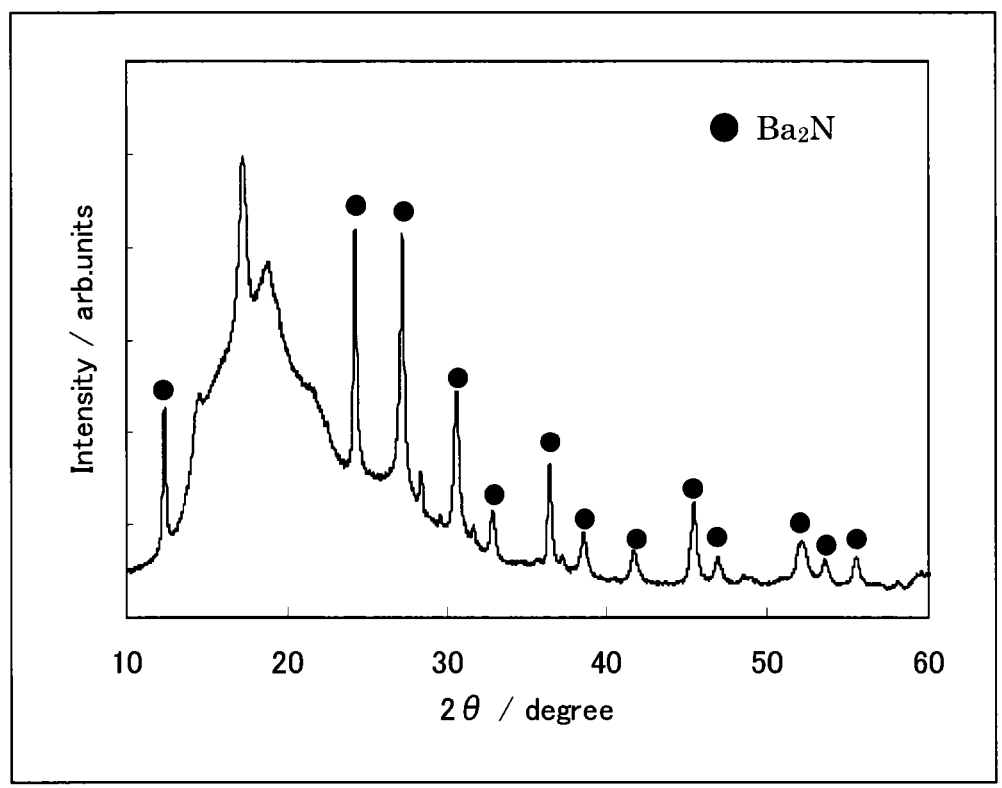
FIG. 7 shows the XRD results of barium nitride obtained in Example 7.

The same operation as that of Example 1 was performed by using 3 g of the obtained barium hydride. A temperature at which the operation was performed under a $N_2$ gas atmosphere was 1000° C., and a reaction time thereof was 4 hours. Powder XRD analysis of the obtained compound was performed. The whole phase was barium nitride ($Ba_2N$) (FIG. 7). The quantity of the obtained barium nitride was determined by a nitrogen-oxygen simultaneous analyzer. The N amount was 4.8 mass %, and the purity calculated from the theoretical amount (4.85 mass %) was 98.9%.

Example 8

Figure 8:
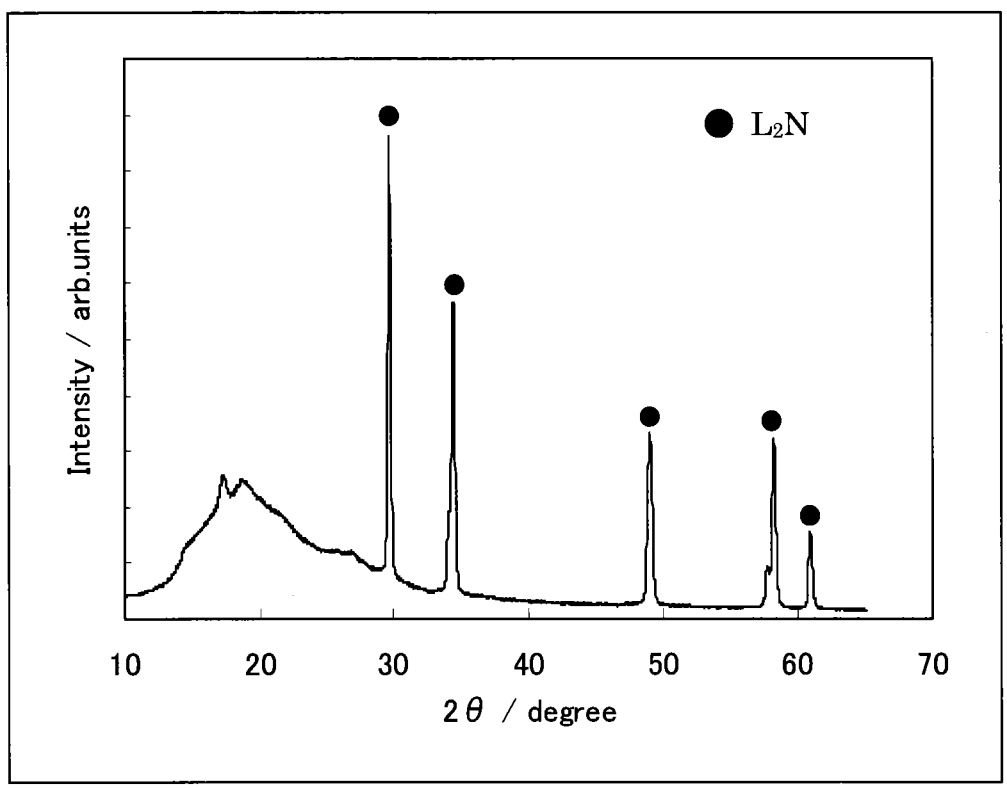
FIG. 8 shows the XRD results of lanthanum nitride obtained in Example 8.

A 200 cc pressure tight container was charged with g of metal lanthanum, then vacuum-exhausted and filled with 0.9 MPa of hydrogen, to perform a reaction at a reaction temperature of 150° C. for 12 hours, to thereby obtain lanthanum hydride as a starting material. The same operation as that of Example 1 was performed by using 3 g of the obtained lanthanum hydride. A temperature at which the operation was performed under a $N_2$ gas atmosphere was 1400° C., and a reaction time thereof was 4 hours. Powder XRD analysis of the obtained compound was performed. The whole phase was lanthanum nitride (LaN) (FIG. 8). The quantity of the obtained lanthanum nitride was determined by a nitrogen-oxygen simultaneous analyzer. The N amount was 9.1 mass %, and the purity calculated from the theoretical amount (9.16 mass %) was 99.3%.

Example 9

Figure 9:
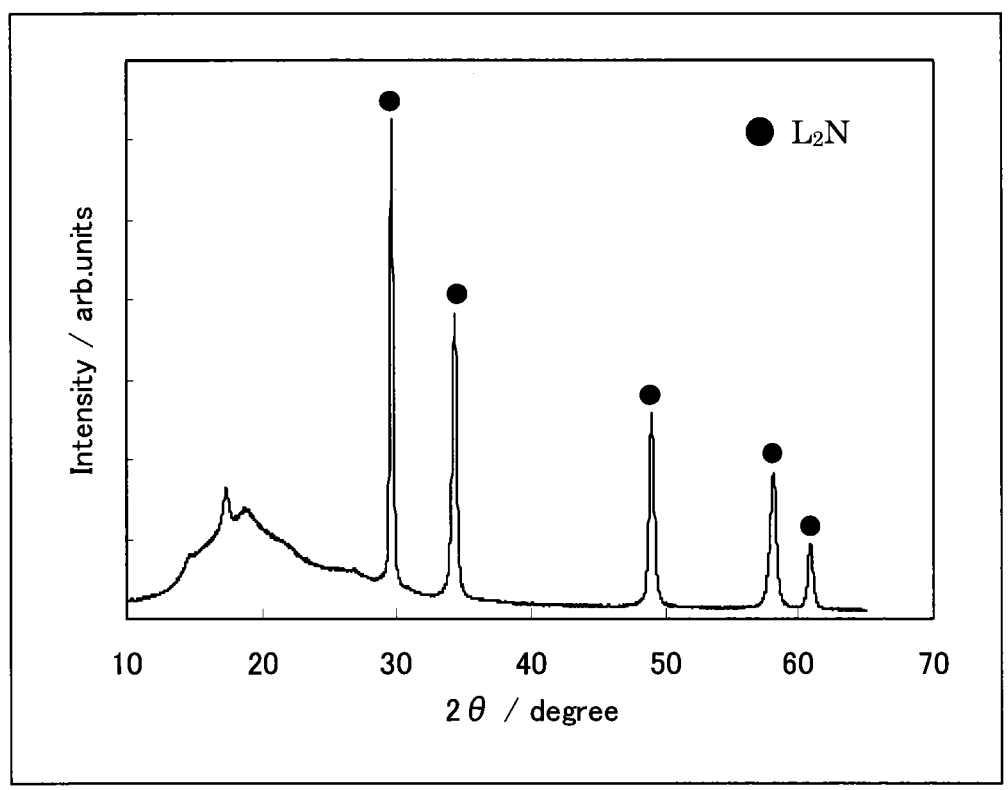
FIG. 9 shows the XRD results of lanthanum nitride obtained in Example 9.

The same operation as that of Example 1 was performed by using 3 g of the obtained lanthanum hydride. A temperature at which the operation was performed under a $NH_3$ gas atmosphere was 800° C., and a reaction time thereof was 4 hours. Powder XRD analysis of the obtained compound was performed. The whole phase was lanthanum nitride (LaN) (FIG. 9). The quantity of the obtained lanthanum nitride was determined by a nitrogen-oxygen simultaneous analyzer. The N amount was 9.1 mass %, and the purity calculated from the theoretical amount (9.16 mass %) was 99.3%.

Example 10

Figure 10:
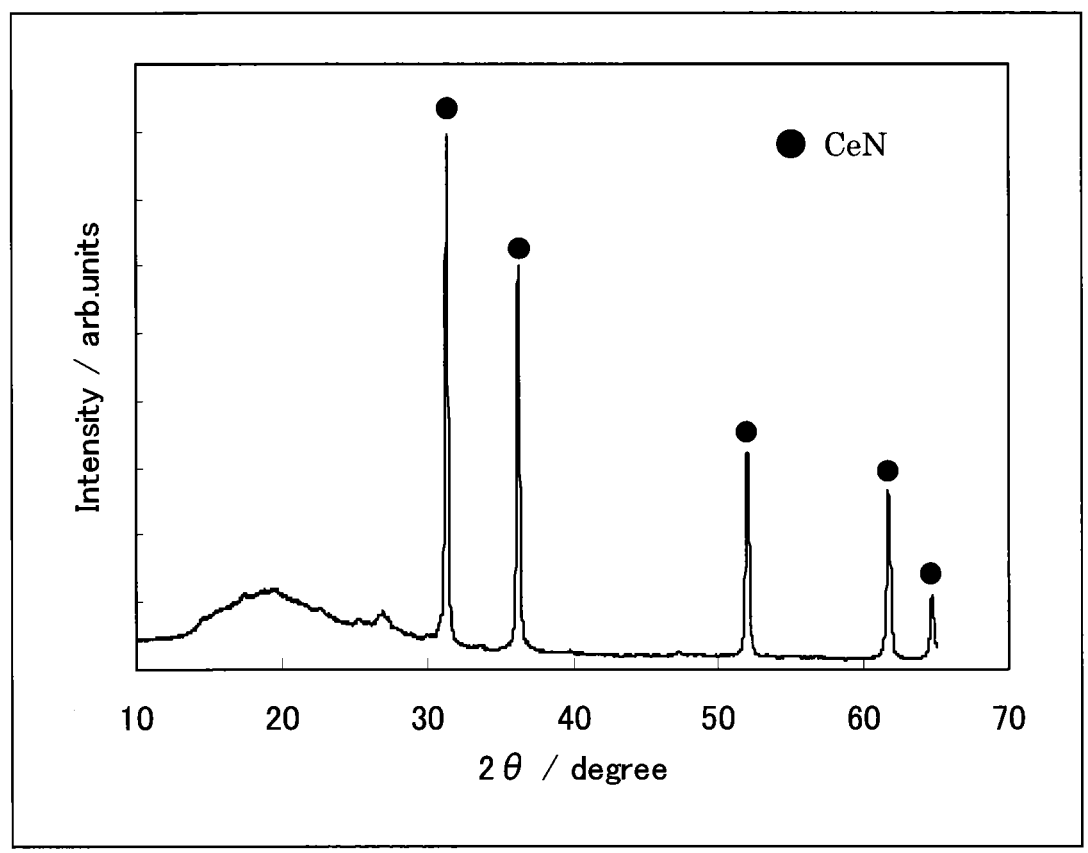
FIG. 10 shows the XRD results of cerium nitride obtained in Example 10.

A 200 cc pressure tight container was charged with 40 g of metal cerium, then vacuum-exhausted and filled with 0.9 MPa of hydrogen to perform a reaction at a reaction temperature of 150° C. for 12 hours, to thereby obtain cerium hydride as a starting material. The same operation as that of Example 1 was performed by using 3 g of the obtained cerium hydride. A temperature at which the operation was performed under a $N_2$ gas atmosphere was 1000° C., and a reaction time thereof was 4 hours. Powder XRD analysis of the obtained compound was performed. The whole phase was cerium nitride (CeN) (FIG. 10). The quantity of the obtained cerium nitride was determined by a nitrogen-oxygen simultaneous analyzer. The N amount was 8.9 mass %, and the purity calculated from the theoretical amount (9.09 mass %) was 97.9%.

Example 11

Figure 11:
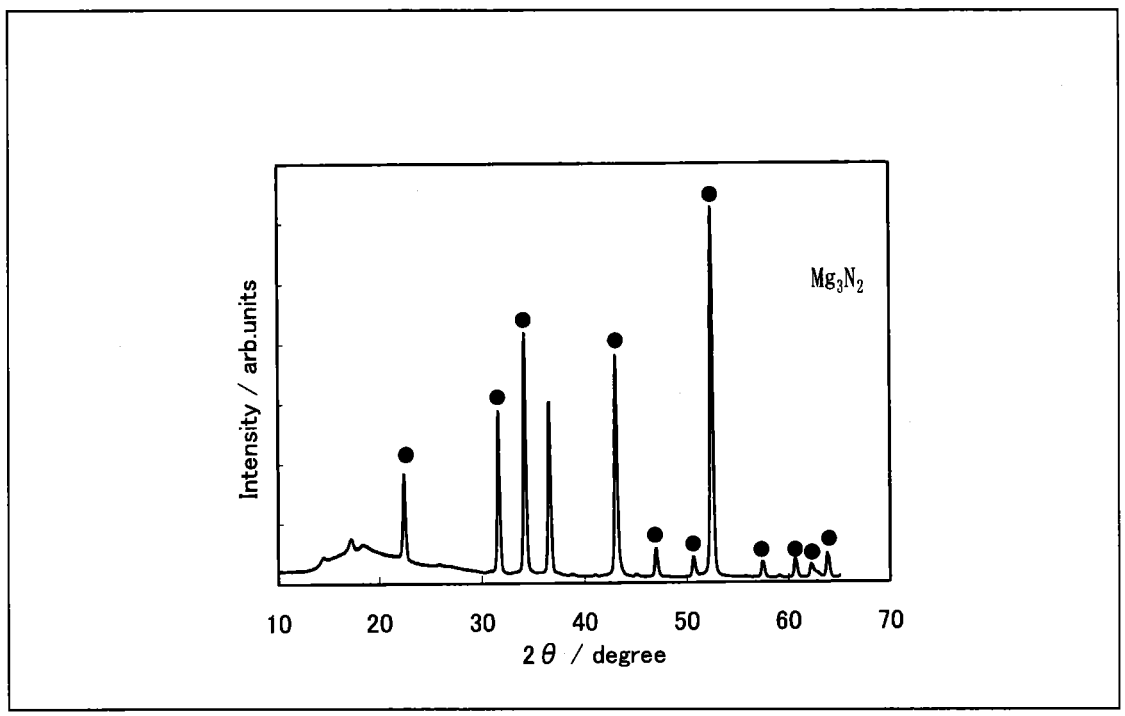
FIG. 11 shows the XRD results of magnesium nitride obtained in Example 11.

The same operation as that of Example 1 was performed by using 3 g of magnesium hydride as a starting material. A temperature at which the operation was performed under a $N_2$ gas atmosphere was 900° C., and a reaction time thereof was 6 hours. Powder XRD analysis of the obtained compound was performed. The whole phase was magnesium nitride ($Mg_3N_2$) (FIG. 11). The quantity of the obtained magnesium nitride was determined by a nitrogen-oxygen simultaneous analyzer. The N amount was 27.1 mass %, and the purity calculated from the theoretical amount (27.76 mass %) was 97.6%.

The invention claimed is:

1. A method for producing a metal nitride, the method comprising:
   heating an alkaline earth metal hydride under a nitrogen gas or an ammonia gas and at a temperature of from 600 to 1000° C., thereby obtaining a metal nitride; or
   heating an alkali metal hydride under a nitrogen gas or an ammonia gas and at a temperature of from 600 to 800° C., thereby obtaining a metal nitride,
   wherein
   said alkaline earth metal hydride is in the form of a powder,
   said an alkali metal hydride is in the form of a powder, and
   said metal nitride is at least one member selected from the group consisting of $Be_3N_2$, $Mg_3N_2$, $Ca_3N_2$, $Ca_2N$, $Sr_3N_2$, $Sr_2N$, $Ba_3N_2$, and $Ba_2N$, or
   is at least one member selected from the group consisting of $Li_3N$, $K_3N$, and $Na_3N$.

2. The method according to claim 1, which comprises heating an alkaline earth metal hydride under a nitrogen gas or an ammonia gas and at a temperature of from 600 to 1000° C., thereby obtaining a metal nitride.

3. The method according to claim 1, wherein the alkaline earth metal hydride is heated at a temperature of from 700 to 900° C.

4. The method according to claim 1, wherein a reaction time is from 10 minutes to 48 hours.

5. The method according to claim 1, wherein a reaction time is from 1 hour to 24 hours.

6. The method according to claim 1, wherein a reaction time is from 3 to 12 hours.

7. The method according to claim 1, which comprises heating an alkali metal hydride under a nitrogen gas or an ammonia gas and at a temperature of from 600 to 800° C., thereby obtaining a metal nitride.

8. A method for producing a metal nitride, the method comprising:
   heating an alkaline earth metal hydride under a nitrogen gas or an ammonia gas and at a temperature of from 600 to 1000° C., thereby obtaining a metal nitride; or
   heating an alkali metal hydride under a nitrogen gas or an ammonia gas and at a temperature of from 600 to 800° C., thereby obtaining a metal nitride,
   wherein
   said alkaline earth metal hydride is in the form of a powder,
   said an alkali metal hydride is in the form of a powder, and
   said metal nitride is at least one member selected from the group consisting of $Mg_3N_2$, $Ca_3N_2$, $Ca_2N$, $Sr_3N_2$, $Sr_2N$, $Ba_3N_2$, and $Ba_2N$, or is $Li_3N$.

9. The method according to claim 8, which comprises heating an alkaline earth metal hydride under a nitrogen gas or an ammonia gas and at a temperature of from 600 to 1000° C., thereby obtaining a metal nitride.

10. The method according to claim 8, wherein the alkaline earth metal hydride is heated at a temperature of from 700 to 900° C.

11. The method according to claim 8, wherein a reaction time is from 10 minutes to 48 hours.

12. The method according to claim 8, wherein a reaction time is from 1 hour to 24 hours.

13. The method according to claim 8, wherein a reaction time is from 3 to 12 hours.

14. The method according to claim 8, which comprises heating an alkali metal hydride under a nitrogen gas or an ammonia gas and at a temperature of from 600 to 800° C., thereby obtaining a metal nitride.

* * * * *